Jan. 15, 1924.
J. FORRESTER ET AL
1,480,819
FRUIT PITTING AND SLICING MACHINE
Filed May 31, 1923    4 Sheets-Sheet 2
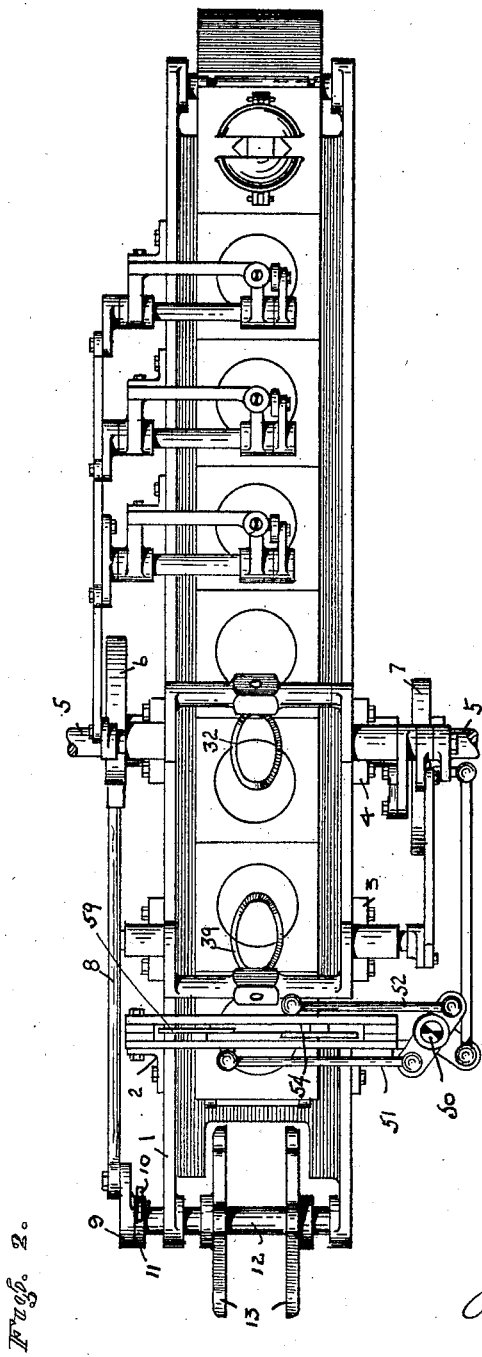

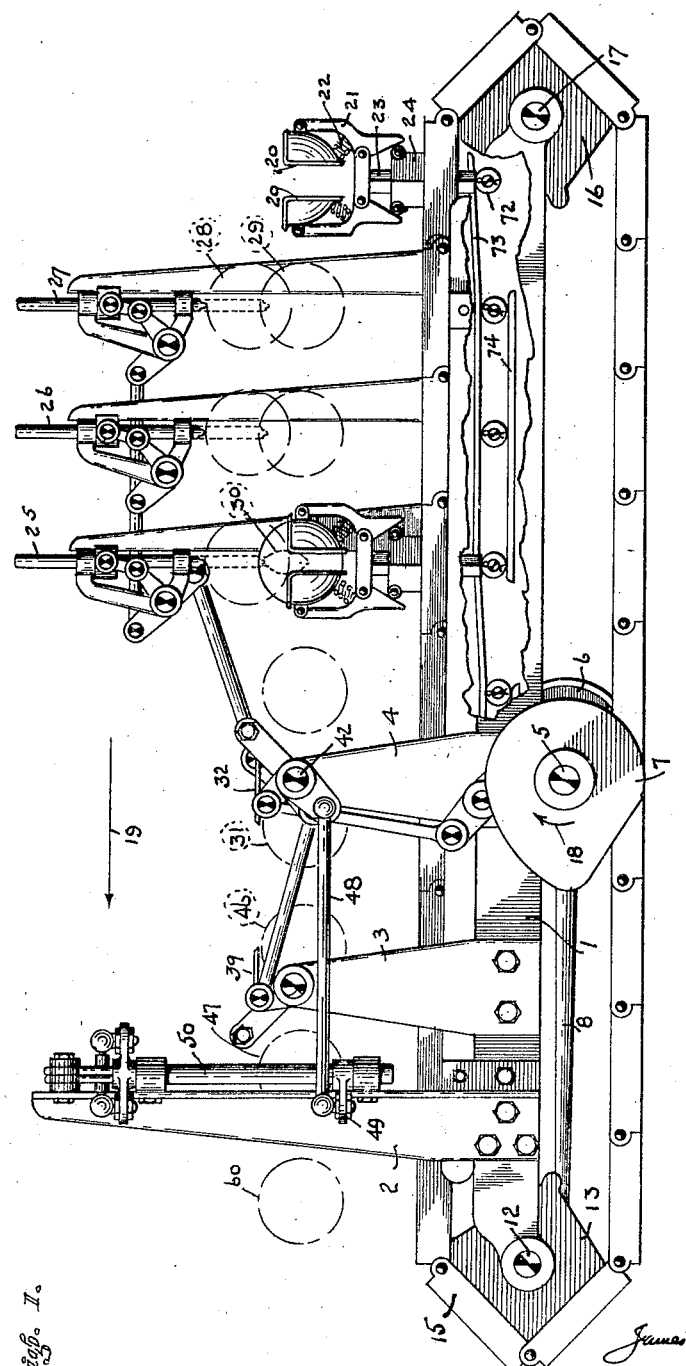

Jan. 15, 1924.  1,480,819
J. FORRESTER ET AL
FRUIT PITTING AND SLICING MACHINE
Filed May 31, 1923     4 Sheets-Sheet 3
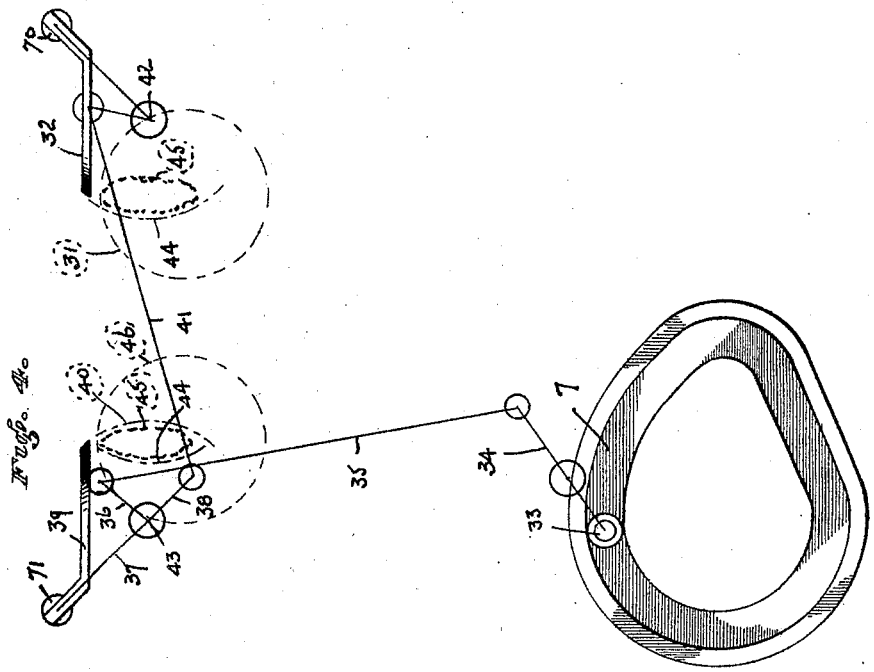
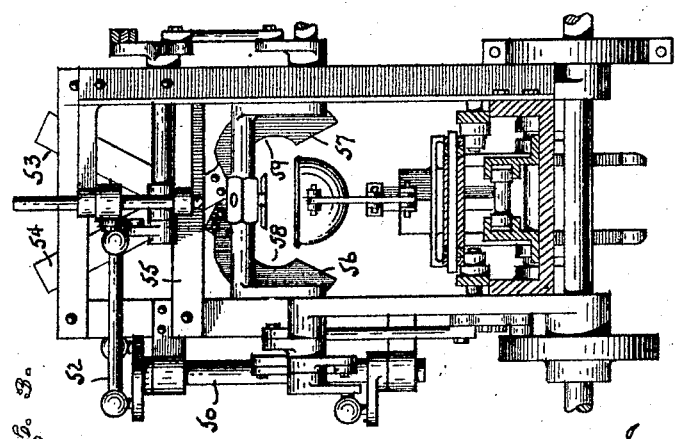
Inventors
James Forrester & John J. Slattery
by
Miller Henry & Boyken
Attorneys.

Jan. 15, 1924.                                                1,480,819
            J. FORRESTER ET AL
          FRUIT PITTING AND SLICING MACHINE
           Filed May 31, 1923    4 Sheets-Sheet 4
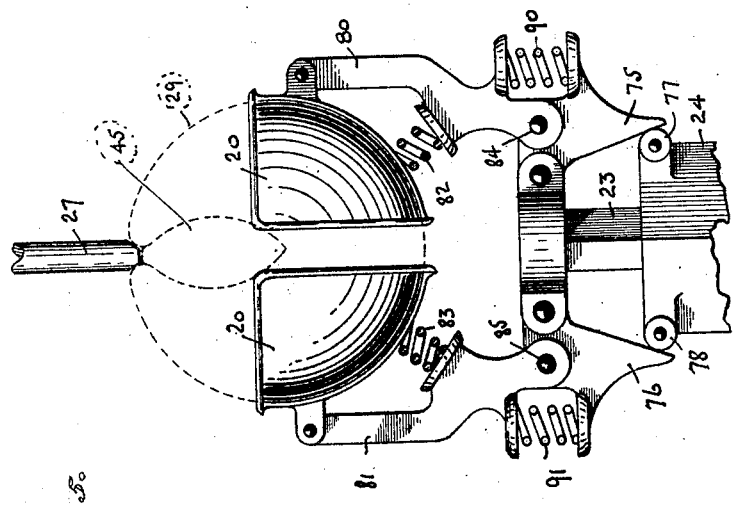

Patented Jan. 15, 1924.

1,480,819

UNITED STATES PATENT OFFICE.

JAMES FORRESTER AND JOHN S. SLATTERY, OF SAN FRANCISCO, CALIFORNIA, ASSIGNORS TO F. & S. PITTING MACHINE CO., INC., A CORPORATION OF CALIFORNIA.

FRUIT PITTING AND SLICING MACHINE.

Application filed May 31, 1923. Serial No. 642,681.

*To all whom it may concern:*

Be it known that we, JAMES FORRESTER and JOHN S. SLATTERY, citizens of the United States, and residents of the city and county of San Francisco, State of California, have invented new and useful Improvements in Fruit Pitting and Slicing Machines, of which the following is a specification.

Our invention has for its object a simple and efficient mechanism for cutting the pits from fruit and thereafter slicing the fruit, and is particularly adapted to clingstone peaches.

Other objects will appear from the drawings and specifications which follow.

These objects we attain by positioning the fruit in cups or containers which thereafter are caused to travel under a positioning and gauging means by which the fruit pit is exactly located with respect to the cutting knives which then cut the pit free from the fleshy portions of the fruit. Thereafter the fruit is moved into a further position where the fleshy portions are cut in a central plane to the pit, the said cutting being carried through from both sides to the already freed pit.

Thereafter the cup carrying the fruit, with the several cuts completed, releases its hold and the fruit in its several parts is dumped into a hopper or other machine, the said act of releasing also causing the several severed parts to separate from each other and from the pit. The pit now being readily separated from the cut fruit by any conventional means as shaking screens.

By referring to the accompanying drawings and description our invention will be more readily understood.

Referring to the figures:

Fig. 1 is a side elevation of a machine of my invention, with some of the unessential frame work and details left out to better show the operating principles and essential elements.

Fig. 2 is a plan of Fig. 1.

Fig. 3 is an end elevation.

Fig. 4 is a diagram of the cam and lever movements showing the operation of the pitting spoons.

Fig. 5 is a front elevation of one of the fruit holding cups.

Throughout the figures similar numerals refer to identical parts.

A main frame work on which the movable parts are mounted is shown at 1 from which standards 2, 3, 4, extend for supporting the operating parts. At 5 is shown a main driving shaft carrying also the eccentric 6 and cam 7, the former adapted to reciprocate the connecting rod 8 and loose crank 9 which carries pawl 10 actuating ratchet wheel 11, and thereby causing the shaft 12 to advance at regular intervals, each movement corresponding with one-half of the cycle of movement of the eccentric 6, thereby carrying the wheels 13 and the chain 15 reaved thereover. At 16 is an idler sprocket mounted upon the shaft 17, also carried on the frame 1.

As the shaft 5 rotates in the direction of the arrow 18, the chain 15 will advance in the direction of the arrow 19.

Mounted upon the chain 15 are a plurality of fruit carriers, each provided with cup elements 20, 20, supported by adjustable arms 21 and springs 22, the arms being fulcrumed on vertically adjustable member 23 carried in the sleeve 24 which latter is mounted upon the chain 15 more particularly described below.

The movement of the eccentric 6 and pawl and ratchet wheel 10 and 11 is so timed that during half of the ratchet movement, each of the fruit cups 20, 20, is positioned vertically under one or the other of the spindles 25, 26, 27, while the spindles are still in their raised or full line position. At this time the operator places the fruit which it is desired to be pitted and sliced into one of the cups and the guide spindle then forces the fruit down into the cup halves 20, 20, compressing the springs 21 until the fruit is gripped in the said cup. In placing the fruit in the said position the operator knowing the position of the stem of the fruit which corresponds with the top of the pit of the fruit, the fruit is positioned with its stem and therefore the pit upward and the positioning spindles 25, 26, 27, then force the fruit against the said spring action until it is positioned exactly the right depth in the cup halves 20, 20. In other words under the guidance of the operator and the action of the stems 25, 26, 27, the fruit is positioned from 28 to 29 with the pit 30 in the uppermost position.

The movement of the ratchet and pawl by the crank arm 9 and eccentric 6 causes the cups to travel at such times as the spindles are stationary in their up position and when the spindles start downward the cup is fixed in its position thereunder until the fruit is properly positioned therein and the movements of the pitting spoons and cutter knives has simultaneously taken place on fruit more advanced in position in the machine.

It will be noted that the position of the fruit, and particularly the pit 30 in the fruit, is first gauged by the vertical moving spindles and is thereafter advanced to the position 31 where it is again brought to a standstill. The fruit is now positioned under the spoon shaped knife 32, see also Fig. 4. A further revolution of the eccentric 6 now rotates the cam member 7 carrying the roller 33 through a cycle of movements which actuates the lever 34, connecting rod 35 and lever 36, pivoted at 43, having the arms 37, 38. These arms actuate respectively the spoon knife 39 which now travels through the path 40. Coincident therewith the arm 38 through the connecting rod 41 actuates the second spoon knife 32 pivoted on the center 42. The spoon knife 32 describes the path 44 cutting through the fleshy portions of the fruit 31 close to the pit 45, see also Fig. 5.

It will now be seen that the operation of the knife 32 while the fruit is in position 31, followed at the next cycle of movement by the operation of the knife 39 when the same fruit is in the position 46 has resulted in cutting a path entirely around the pit 45 within the said fruit and thereby freeing the pit from the fleshy portions of the fruit. The pit is still held, however, incased in the fleshy portions until the fruit is later sliced as will now be described.

The next cycle of movement transfers the fruit from the position 46 to the position 47 where it undergoes the slicing operation. This slicing operation is caused coincidentally with the movement of the spindles 25, 26, 27, and cutters 32, 39, but upon fruit which has previously passed through the said steps of positioning and cutting. The movement of the shaft 42 actuates the rod 48, bell crank 49, spindle 50 of Fig. 1 which in turn causes the reciprocating rods 51, 52, respectively, of Fig. 2, to move the knife arms 53, 54, which are pivoted in the conventional way to the frame member 55 to cause the knives 56, 57, to approach each other between the two halves of the cup 20, 20, thus slicing the fleshy portion of the fruit entirely around and to the pit, the knives having spaces 58, 59, providing clearance for the said pit. The next movement of the shaft 5 carries the fruit in which the pit has now been cut free from the flesh and the fleshy portion sliced in halves into position 60 and further successive movements carry the fruit around the sprocket 13 on the chain 15 when it is discharged into any conventional grading machine, screen or the like, the two halves separating and the pit falling clear thereof.

It is preferable to arrange a shaking screen through which the pit will pass but will restrain the now finished halves of the fruit, which being free from the pits may be passed into the conventional peeling apparatus.

The cups continue on around the machine again, and again, come into position on the upper half ready to receive fresh fruit.

The shape of the pitting knives 32, 39, is preferably as shown in Fig. 2 where it will be seen that they are made hollow, preferably having sharpened edges. They are also made adjustable on the spindle 71 (see Fig. 4) whereby the radii paths 40, 44 which they describe in the fruit about the pit may be varied to suit the sizes of the pits, as determined by a previous grading of the fruit.

Also it will be seen that the cup member 20, 20, (Fig. 5) carried on the spindle 23 grips the fruit as it passes from the positioning spindle towards the left of Fig. 1, by the action of the roller 72, which is depressed by the cam plate 73; this pulls the spindle 23 downward against the track 74. This downward movement of the spindle 23 forces the bell crank levers 75, 76, outward by forcing them to ride upon the rollers 77, 78, respectively, carried on the stem 24 and this movement of the bell crank levers force the cups 20, 20, towards each other gripping the fruit 29 in its initial position, and holding it so gripped, during the subsequent operations, viz: during the gauging under the spindles 25, 26, 27, and cutting under the pitting knives 32, 39, and slicing by the knives 56, 57, and until the fruit arrives in the position 60 of Fig. 1, at which time the roller 72 rides free from the cam plate 73 and the cups 20, 20, release their gripping action upon the now finished fruit enabling it to fall freely as above described.

Referring particularly to Fig. 5 it will be seen that the two halves 20, 20, are pivoted upon the arms 80, 81, and are further spring separated therefrom by the springs 82 and 83 and that these arms are pivoted at 84, 85, respectively, to the before mentioned bell cranks 75, 76. These cranks in turn being pivoted to the spindle 23. The operator places the fruit in the cups 20, 20, and under the action of the spindle 27 the fruit being positioned with the pit 45 in the uppermost position it is depressed within the cups compressing the springs 82, 83 and the further springs 90, 91, until it occupies its final position of perfect adjustment ready for the subsequent operations above described.

We claim:
1. In a fruit pitting and slicing machine a plurality of pairs of cup elements mounted to travel into a plurality of consecutive fixed positions and adapted to hold a fruit embraced between each pair, gauging means which adjust the fruit while in the first of said positions, right and left pitting spoons adapted to operate on the fruit at consecutive positions and slicing knives adapted to thereafter slice the fruit to the pit.

2. In a fruit pitting and slicing machine a plurality of pairs of cup elements mounted to travel into a plurality of consecutive fixed positions and adapted to hold a fruit embraced between each pair, gauging means which adjust the fruit while in the first of said positions, right and left pitting spoons adapted to operate on the fruit at consecutive positions and slicing knives adapted to thereafter slice the fruit to the pit and automatic mechanism causing the alternating movement of the cup elements and the knives.

3. In a fruit pitting and slicing machine a plurality of pairs of cup elements mounted to travel into a plurality of consecutive fixed positions and adapted to hold a fruit embraced between each pair, gauging means which adjust the fruit while in the first of said positions, right and left pitting spoons adapted to operate on the fruit at consecutive positions and slicing knives adapted to thereafter slice the fruit to the pit and automatic mechanism causing the alternating movement of the cup elements and the knives, and comprising a traveling chain member on which the cup elements are mounted in spaced relation and a track for said elements, means for actuating said knives, and operating parts constructed and adapted to alternately advance the chain and the knives.

4. In a fruit pitting and slicing machine a plurality of pairs of cup elements mounted to travel into a plurality of consecutive fixed positions and adapted to hold a fruit embraced between each pair, gauging means which adjust the fruit while in the first of said positions, right and left pitting spoons adapted to operate on the fruit at consecutive positions and slicing knives adapted to thereafter slice the fruit to the pit and automatic mechanism causing the alternating movement of the cup elements and the knives, and comprising a traveling chain member on which the cup elements are mounted in spaced relation and a track for said elements, means for actuating said knives, and operating parts constructed and adapted to alternately advance the chain and the knives, and comprising an eccentric and an arm therefrom and a pawl and ratchet and means actuated thereby to advance said chain through one half cycle of the eccentric arm movement and a cam and parts associated with said eccentric and actuating the gauging means and the spoons and the knives during the other half cycle movement.

5. Mechanism as set forth in claim 1 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position.

6. Mechanism as set forth in claim 1 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position with a space between the elements through which the slicing knives enter the fruit and said elements cut away in their upper portions to admit the pitting spoons free access to the fruit.

7. Mechanism as set forth in claim 4 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position with a space between the elements through which the slicing knives enter the fruit and said elements cut away in their upper portions to admit the pitting spoons free access to the fruit.

8. Mechanism as set forth in claim 1 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position, and wherein said pitting spoons are mounted on separate spindles to describe right and left arcs through the fruit adjacent the pit.

9. Mechanism as set forth in claim 1 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position, and wherein said pitting spoons are mounted on separate spindles to describe right and left arcs through the fruit adjacent the pit, and thereafter the slicing knives are reciprocated in a plane at right angles to the path of the spoons.

10. Mechanism as set forth in claim 1 wherein the pairs of cup elements are each supported from brackets on a vertically adjustable spindle, and wherein springs are interposed between said elements and said spindles, whereby the fruit is gripped as the gauging means depresses the fruit and cup elements and spindles into predetermined adjusted position with a space between the elements through which the slicing knives enter the fruit and said elements cut away in their upper portions to admit the pitting spoons free access to the fruit and wherein said pitting spoons are mounted on separate spindles to describe right and left arcs through the fruit adjacent the pit.

JAMES FORRESTER.
JOHN S. SLATTERY.